US012757897B2

(12) United States Patent
Readnour et al.

(10) Patent No.: US 12,757,897 B2
(45) Date of Patent: Oct. 13, 2026

(54) FEED AND METHODS FOR CONTROLLING TICK INFESTATIONS IN A MAMMAL

(71) Applicant: In the Bowl Animal Health, Inc., Nashville, TN (US)

(72) Inventors: Robin S. Readnour, Nashville, TN (US); Kevin E. Willard, Knightstown, IN (US); Joseph R. Winkle, Carmel, IN (US)

(73) Assignee: In the Bowl Animal Health, Inc., Nashville, TN (US)

( * ) Notice: Subject to any disclaimer, the term of this patent is extended or adjusted under 35 U.S.C. 154(b) by 192 days.

(21) Appl. No.: 18/463,817

(22) Filed: Sep. 8, 2023

(65) Prior Publication Data

US 2023/0413818 A1 Dec. 28, 2023

Related U.S. Application Data

(63) Continuation of application No. PCT/US2022/019870, filed on Mar. 11, 2022.

(60) Provisional application No. 63/159,644, filed on Mar. 11, 2021.

(51) Int. Cl.
*A01N 43/22* (2006.01)
*A01P 17/00* (2006.01)

(52) U.S. Cl.
CPC .............. *A01N 43/22* (2013.01); *A01P 17/00* (2021.08)

(58) Field of Classification Search
None
See application file for complete search history.

(56) References Cited

U.S. PATENT DOCUMENTS

| | | | |
|---|---|---|---|
| 6,664,237 | B1 | 12/2003 | Snyder |
| 6,927,210 | B1 | 8/2005 | Thompson et al. |
| 9,220,719 | B2 | 12/2015 | Riggs et al. |
| 2003/0202997 | A1 | 10/2003 | Campbell et al. |
| 2007/0049631 | A1 | 3/2007 | Mertens et al. |
| 2010/0204277 | A1 | 8/2010 | Bowles et al. |
| 2010/0286076 | A1 | 11/2010 | Snyder et al. |
| 2012/0195961 | A1 | 8/2012 | Kritikou et al. |
| 2013/0131017 | A1 | 5/2013 | Akama et al. |
| 2013/0203692 | A1 | 8/2013 | Soll et al. |
| 2013/0210755 | A1 | 8/2013 | Marr et al. |
| 2016/0115189 | A1 | 4/2016 | Chen et al. |
| 2016/0184340 | A1 | 6/2016 | Kritikou |
| 2018/0279613 | A1 | 10/2018 | Hepler et al. |
| 2020/0179345 | A1 | 6/2020 | Soll et al. |

FOREIGN PATENT DOCUMENTS

| | | | |
|---|---|---|---|
| JP | 2012001563 | A | 1/2012 |
| WO | 2001/11962 | A1 | 2/2001 |
| WO | WO 2001/11963 | A1 | 2/2001 |
| WO | WO2001011963 | A1 * | 2/2001 |
| WO | 2005/041950 | A1 | 5/2005 |
| WO | 2006127322 | A2 | 11/2006 |
| WO | 2010/129491 | A1 | 11/2010 |

OTHER PUBLICATIONS

International Preliminary Report on Patentability for PCT/US2022/019866, Sep. 21, 2023 (7 pages).
International Search Report and Written Opinion for PCT/US2022/019866, May 3, 2022 (8 pages).
Holmstrom, et al., Pharmacokinetics of spinosad and milbemycin oxime administered in combination and separately per os to dogs, Journal of Veterinary Pharmacology and Therapeutics, Sep. 6, 2011, vol. 35, Issue 4, p. 351-364, Blackwell Publishing Ltd., United States.
International Preliminary Report on Patentability for PCT/US2022/019870, Sep. 21, 2023 (7 pages).
International Search Report and Written Opinion for PCT/US2022/019870, Jun. 10, 2022 (8 pages).
International Preliminary Report on Patentability, PCT/US2022/019913, Sep. 12, 2023, 8 pages.
International Search Report and Written Opinion, PCT/US2022/019913, Jun. 17, 2022, 9 pages.
Dryden, Michael W. et al., Evaluation of sarolaner and spinosad oral treatments to eliminate fleas, reduce dermatologic lesions and minimize pruritus in naturally infested dogs in west Central Florida, USA. Parasites & Vectors, 2017 10:389.
Qureshi et al., Development of advantus TM (imidacloprid) soft chewable tablets for the treatment of Ctenocephalides felis infestations on dogs. Parasites & Vectors, 2015 8:407.
Tagesu, Preparation and administration of medicaments body weight of animals and drug dosage. International Journal of Veterinary Science and Research, Aug. 14, 2018, s1:024-030.
Snyder, et al., Preliminary study on the acaricidal efficacy of spinosad adminstered orally to dogs infested with the brown dog tick, *Rhipicephalus sanguineus* (Latreille, 1806) (Acari: Ixodidae), Veterinary Parasitology, Elsevier, Jul. 2009.

(Continued)

*Primary Examiner* — Celeste A Roney
(74) *Attorney, Agent, or Firm* — Bose McKinney & Evans LLP

(57) ABSTRACT

An oral animal feed and a method of controlling ticks in a mammal in need thereof by orally administering to the mammal an effective amount of a spinosyn for an effective time to thereby cause the amount of spinosyn in the mammal's blood to rise to and maintain at a therapeutically effective level for controlling ticks.

19 Claims, 2 Drawing Sheets

(56) References Cited

OTHER PUBLICATIONS

White, et al., Initial evaluations of the effectiveness of spinetoram as a long-acting, oral systemic pulicide for controlling cat flea (*Ctenocephalides felis*) infestations on dogs, Veterinary Parasitology, 233, 25-31 (2017).
International Preliminary Report on Patentability, PCT/US2022/034685, Jan. 4, 2024, 7 pages.
International Search Report and Written Opinion, PCT/US2022/034685, Oct. 20, 2022, 7 pages.

* cited by examiner

FEED AND METHODS FOR CONTROLLING TICK INFESTATIONS IN A MAMMAL

RELATED APPLICATIONS

This application is a continuation of International Patent Application No. PCT/US2022/019870, filed Mar. 11, 2022, which claims priority to U.S. Provisional Patent Application No. 63/159,644, filed Mar. 11, 2021, both of which are hereby incorporated herein by reference.

TECHNICAL FIELD

The teachings of this disclosure generally relate to a spinosyn, a feed that includes the spinosyn and a method of administering the spinosyn to control tick infestations in mammals.

BACKGROUND AND SUMMARY

Ticks are vectors of a number of different pathogenic agents in mammals. Examples of diseases which are caused by ticks include borreliosis (Lyme disease caused by *Borrelia burgdorferi*), babesiosis (or piroplasmosis caused by *Babesia microti*) and rickettsiosis (Rocky Mountain spotted fever). Ticks also release toxins, which can cause inflammation or paralysis in the host.

Tick infestations of wild animals such as deer, elk, caribou, moose, etc., can lead to the spread of diseases from herd to herd or from wild animals to domesticated animals (e.g., cattle, cats and dogs) and humans.

Farm animals are also susceptible to various tick infestations, for example, the tick genus *Rhipicephalus*, especially those of the species *microplus* (cattle tick), *decoloratus* and *annulatus*. Ticks such as *Rhipicephalus microplus* are particularly difficult to control because they live in pastures where farm animals graze. In addition to cattle, *Rhipicephalus* spp. and other tick genera may infest buffalo, horses, donkeys, goats, sheep, deer, pigs, cats and dogs. A heavy tick burden on mammals can decrease production and damage hides as well as transmit diseases such as babesiosis ("cattle fever") and anaplasmosis caused by protozoan parasites.

In addition to farm animals, ticks also spread disease to companion animals and humans, including, for example, Lyme disease, ascending paralysis and Rocky Mountain spotted fever.

Of particular concern, the health related risks of tick infestations in companion animals extend to humans. [Center for Disease Control and Prevention, Illnesses on the Rise, Vital Signs, May, 2018, available at https://www.cdc.gov/vitalsigns/vector-borne/] Companion animals such as dogs and cats are increasingly common in households worldwide. Globally, around 471 million dogs and 373 million cats are kept as household pets. In the U.S. alone, pet ownership has tripled since the 1970s. Unfortunately, ticks can infest these companion animals. Infested companion animals expose their human owners to increased risk of illness. One way to control human risk from ticks is to control the risk of infestation in companion animals.

Treatments currently available for controlling tick infestations achieve varying degrees of success. Many treatments involve chemicals applied to indoor and outdoor surfaces, as well as to the animal. The chemicals used include a variety of carbamates, organophosphates, certain macrocyclic lactones, fiproles, pyrethrins and pyrethroids. These compounds often have toxic side effects that are a problem for both the animal and animal owners. In addition, there is evidence that the use of these chemicals may be ineffective due to acaricide resistance and treatment deficiencies.

Topical treatments are a well-known method for controlling tick infestations. While there are numerous ways to deliver these therapeutic agents to the coats and skins of mammals, many of these methods are either ineffective and/or present safety risks to the mammal or user during or after the dispensing activity. More particularly, because a physical connection must be achieved between the applicator tip and the drug delivery device when the applicator tip is installed thereon, there is inherently a risk that the connection will be inadequate, thereby permitting some of the therapeutic agent to leak out of the device and into physical contact with the user. For example, in the case of larger canines, it may be difficult to maneuver the dispenser with one hand and maintain the canine in place with the other hand, resulting in some, if not all, of the substance being spilled on the floor or on the person applying it instead of reaching the canine's skin. Not only is this leakage wasteful and messy, it also places the user at a heightened risk of suffering from a skin irritation or other such health concern, particularly if the user comes into direct contact with the agent.

Oral treatments are also available for companion animals. However, to be effective, the owner must administer a treatment once every 30-90 days, for example. The extended time between treatments creates compliance issues when owners forget to administer doses.

Despite the availability of effective treatments, a recent study by The Harris Poll found that 33% of pet owners do not routinely protect their pets against ticks at all. Another study found that pet owners purchased, on average, only 4 months of tick prevention products per year per pet, despite being told that pets needed to be given tick prevention treatments year-round. Thus, there continues to be a need for relatively safe, effective agents for controlling tick infestations on companion animals that is easier for owners to remember to use.

Surprisingly, it has been discovered by the inventors that spinosyns, such as spinosad, can provide improved control over tick infestations when orally administered in smaller, more frequent/chronic doses. Until now, spinosyns were generally considered ineffective for tick control in pets, or more generally, in mammals because the doses were administered on a monthly basis and the amount of spinosyn in the animal's blood drops too quickly to control tick infestations.

The method and composition taught herein have the further advantage of encouraging compliance because the smaller doses of a spinosyn can be incorporated into a daily feed that, at least in the case of companion animals, would be given to the companion animal in any event, making it less likely that owners will forget or neglect to administer the treatment. Thus, this disclosure provides a method for prolonged control of ticks in a safer and more effective manner than that achieved with previously known treatments. The administration of spinosyn is discussed below as being combined with feed. However, it is also contemplated that the spinosyn may be administered by itself or in a dosage form other than feed, such as a chew, tablet, liquid, gel or other suitable form for oral administration.

Spinosyns are naturally derived fermentation products. They are macrolides produced by cultivation of *Saccharopolyspora spinosa*. The fermentation of *S. spinosa* produces many factors, including spinosyn A and spinosyn D (also called A83543A and A8354D). Spinosyn A and spinosyn D are the two spinosyns that are most active as insecticides. A product comprised mainly of these two spinosyns is available commercially under the generic name "spinosad". The major spinosyn factor, spinosyn A, is particularly known to have an excellent human and mammal safety and toxicological profile.

Each spinosyn has a 12-membered macrocyclic ring that is part of an unusual tetracyclic ring system to which two different sugars are attached, the amino-sugar forosamine and the neutral sugar 2N,3N,4N-(tri-O-methyl)rhamnose. This unique structure sets the spinosyns apart from other macrocyclic compounds.

Spinosyn A was the first spinosyn isolated and identified from the fermentation broth of *S. spinosa*. Subsequent examination of the fermentation broth revealed that *S. spinosa* produced a number of spinosyns that have been called spinosyns A to J (A83543A to J). The primary components are spinosyns A and D. Additional spinosyns, lettered from K to W, have been identified from mutant strains of *S. spinosa*. The various spinosyns are characterized by differences in the substitution patterns on the amino group of the forosamine, at selected sites on the tetracyclic ring system and on the 2N,3N,4N-(tri-O-methyl)rhamnose group.

Boeck et al. described spinosyns A-H and J (which they called A83543 factors A, B, C, D, E, F, G, H and J), and salts thereof, in U.S. Pat. No. 5,362,634 (issued Nov. 8, 1994); U.S. Pat. No. 5,496,932 (issued Mar. 5, 1996); and 5,571,901 (issued Nov. 5, 1996). Mynderse et al. described spinosyns L-N (which they called A83543 factors L, M and N), their N-demethyl derivatives, and salts thereof, in U.S. Pat. No. 5,202,242 (issued Apr. 13, 1993); and Turner et al. described spinosyns Q-T (which they called A83543 factors Q, R, S and T), their N-demethyl derivatives, and salts thereof, in U.S. Pat. No. 5,591,606 (issued Jan. 7, 1997) and 5,631,155 (issued May 29, 1997). Spinosyns K, O, P, U, V, W and Y are described, for example, by Carl V. DeAmicis, James E. Dripps, Chris J. Hatton and Laura I. Karr in American Chemical Society's Symposium Series: Phytochemicals for Pest Control, Chapter 11, "Physical and Biological Properties of Spinosyns: Novel Macrolide Pest-Control Agents from Fermentation", pages 146-154 (1997).

The spinosyns can react to form salts that are also useful in the methods and formulations of this disclosure. The salts are prepared using standard procedures for salt preparation. For example, spinosyn A can be neutralized with an appropriate acid to form an acid addition salt. The acid addition salts of spinosyns are particularly useful. Representative suitable acid addition salts include salts formed by reaction with either an organic or inorganic acid such as, for example, sulfuric, hydrochloric, phosphoric, acetic, succinic, citric, lactic, maleic, fumaric, cholic, pamoic, mucic, glutamic, camphoric, glutaric, glycolic, phthalic, tartaric, formic, lauric, stearic, salicylic, methanesulfonic, benzenesulfonic, sorbic, picric, benzoic, cinnamic and like acids.

The term "spinosyn" as used herein refers to an individual spinosyn factor (spinosyn A, B, C, D, E, F, G, H, J, K, L, M, N, O, P, Q, R, S, T, U, V, W or Y), an N-demethyl derivative of an individual spinosyn factor, a chemically modified spinosyn such as spinetoram, a salt of any of the aforementioned, a metabolite of any of the aforementioned, a physiologically acceptable derivative thereof, or a combination thereof.

Spinosyns also provide advantages because they are very effective against ticks with post-treatment residual protection, when the dosages described herein are used according to the method disclosed herein. Furthermore, spinosyns have no acaricidal cross-resistance to existing compounds. Thus, they are especially useful against tick populations on mammals that have existing levels of resistance to currently used acaricidal products. Spinosyns, therefore, can be used in integrated pest management (IPM) programs to extend the lifeline of commonly used products where resistance is not well developed or has not yet developed.

Systemic efficacy (e.g., ingestion of blood containing spinosyns by ticks) provides a different mode of exposure compared to topically applied formulations where contact with the tick at the skin surface is the mode of exposure. The advantages of oral systemic treatments and killing of ticks from their ingestion of blood, compared to topical applications and contact killing, include:

a) reduced exposure to the human applicator and children and objects in the mammal's environment (e.g., flooring, carpets, furniture);
b) no worry about loss from exposure of the mammal to water (lakes, streams, bathing, etc.) or from loss due to rubbing;
c) no concern about UV exposure and degradation;
d) no problems with oxidation from oils on skin, etc.; and
e) assurance that the entire dose is administered (compared to a topical application where some of the dose may drip off, rub off and/or remain in the dispensing tube immediately after treatment).

The formulations, or feeds, and methods of this disclosure may further include, in combination with the spinosyn, one or more other active substances having therapeutic efficacy. Such active substances include agents efficacious against ticks. Active substances may include, for example, isoxazolines, certain macrocyclic lactones, tick specific chitin synthesis inhibitors, pyridines and pyrazoles or fiproles.

The methods of this disclosure are carried out by administering the spinosyn to the mammal in small, frequent doses. To facilitate routine dosing, the spinosyn administration may be carried out using a daily feed. A number of different feeds are envisioned, provided the manufacturing process(es) and feed compositions do not have deleterious effects related to efficacy, safety and stability on the spinosyn and, if applicable, other active substances. For example, feeds in the broad categories of dry feeds, semi-moist feeds, wet feeds, canned-retorted feeds, fresh refrigerated feeds, and supplemental feeds including treats, snacks and other supplemental feeds may be adapted for use with this disclosure. The mammal receives a maintenance quantity of spinosyn by consuming the feed product on a weekly, semi-weekly or daily basis.

By incorporating smaller doses of spinosyn into an animal feed composition and administering it at an effective frequency (most likely daily), the blood level of spinosyn rises over time until it reaches an optimal steady state where it can be maintained by a daily or substantially daily dosage. By contrast, when spinosyn is orally administered in larger doses at lower frequency, e.g., a single treatment of a large dose that is administered via "treat" once in a 30-day period, the level of spinosyn in the blood spikes at the time of the dose and then declines until the next dose is administered. The administration of a large dose at low frequency means that the animal must consume more spinosyn in each dose so that the blood level of spinosyn does not fall below the necessary level for effective protection before the next dose. Because of the rapid and precipitous decline in the blood level of spinosyn, it has not been possible to maintain a sufficient blood level to control tick infestations using a monthly dosing strategy.

DESCRIPTION

Figure 1:
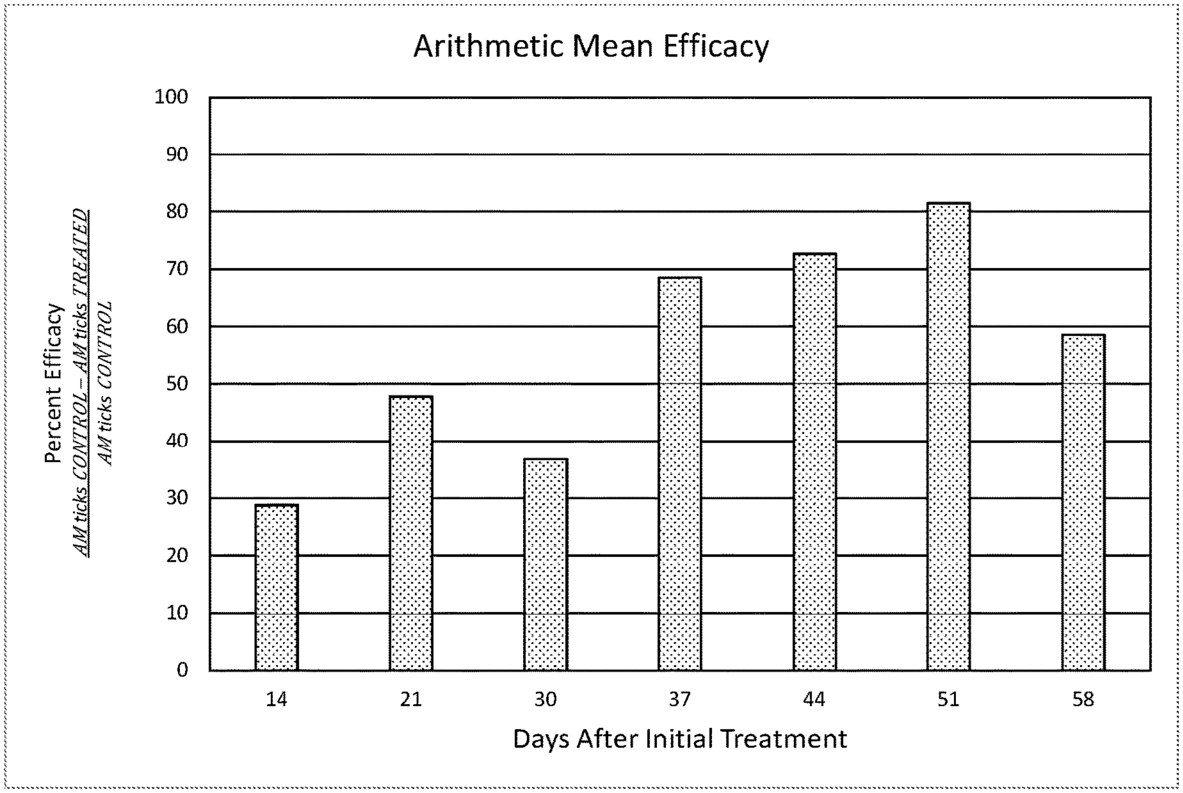
FIG. 1. A graph of the Arithmetic Mean Efficacy, Percent Efficacy=[AM ticks CONTROL−AM ticks TREATED]/AM ticks CONTROL, measured at 14, 21, 30, 37, 44, 51, and 58 days after treatment with spinosad.

All ratios, percentages, and parts discussed herein are "by weight" unless otherwise specified.

The term "controlling a tick infestation" refers to preventing, treating, minimizing or eliminating an infestation by ticks on a mammal.

The term "tick" refers to any member of the order Ixodida. The term "tick" includes the egg, larval, nymph, and adult stages of development. More particularly, the term tick includes ticks of the families Ixodidae and Argasidae. More particularly, the term "tick" includes species of the genera *Africaniella, Amblyomma, Anomalohimalaya, Bothriocroton, Dermacentor, Haemaphysalis, Hyalomma, Ixodes, Margaropus, Nosomma, Rhipicentor, Rhipicephalus, Antricola, Argas, Nothoaspis, Ornithodoros*, and *Otobius.*

The term "mammal" refers to any member of the class Mammalia. In particular, it may refer to wild mammals, such as wolves, coyotes, jackals, deer, elk, moose, reindeer, and the like. It may also refer to farm animals, such as cows, sheep, pigs, bison, horses and the like. It may also refer to companion animals. It may also refer to humans.

The term "companion animal" refers to any domestic animal that may be kept as a pet. This includes, but is not limited to, horses, dogs, wolves, coyotes, cats, hamsters, gerbils, mice, guinea pigs, ferrets, rabbits, etc.

The term "canine" refers to any member of the genus *Canis*, which includes such species as wolves, dogs, coyotes and jackals.

The term "feline" refers to any member of the subfamily Felidae, which includes such species as the domestic cat, bobcats, wildcats, ocelots, members of the genus lynx, Pallas's cat and cougars.

In carrying out the methods of this disclosure, a "feed" is an animal feed, snack, treat or other supplemental feed that may be administered daily or substantially daily. By using different forms of feed, e.g., kibble and treats or chews, the mammal's meals and snacks may be varied from time to time while still conveniently administering a daily dose of spinosyn.

The term "chew" refers to a treat that has flavor and aromatic properties that are appealing to a canine, but typically has no nutritional value. In carrying out the methods of this disclosure, a "feed" and/or a "chew" may be used interchangeably.

The term "effective time", also referred to herein as "effective duration", for the purposes of this disclosure includes at least the duration of feed administration needed to bring the level of spinosyn in the mammal's blood to a sufficiently high level for controlling ticks, i.e., a "therapeutically effective" level. In some embodiments, the effective time may be as little as three days. In other instances, the effective time may be seven days or fifteen days or longer. As discussed below, the effective time will vary based on how frequently the feed or spinosyn is administered.

As just alluded, the "effective time" will vary as a function of the frequency at which the feed is administered. The term "effective frequency" as used herein means the number of feedings over a given time that produce a therapeutically effective concentration of spinosyn in the mammal's blood. In all events, the term "effective frequency" as used herein contemplates multiple feedings including the spinosyn per month. One of skill in the art will appreciate that the feed may be administered in a range of frequencies. For example, the spinosyn may be administered at a frequency of daily, every other day, every third day, once per week or even at inconsistent time intervals.

Further, as discussed above, the effective frequency may affect the duration required to obtain a therapeutically effective level of spinosyn in the mammal's blood. By way of example, if the mammal were being fed the feed composition daily, the duration of feed administration required to achieve a therapeutically effective level of spinosyn in the mammal's blood, and thus the "effective time", would be comparatively less than if the mammal were being fed the feed composition only once or twice per week.

Further, the effective frequency is influenced by the amount of the daily dose in mg/kg of body weight of the mammal. Particularly, at slightly higher daily doses, e.g., greater than 1.0 mg/kg, missed doses have less of an impact on efficacy.

Further, the effective frequency is influenced by the duration of treatment. In the initial stages, i.e., before the amount of spinosyn in the mammal's blood has reached a therapeutically effective level, the animal feed may need to be administered at a greater frequency than would be necessary if it were being administered after a longer period of use, i.e., once a therapeutically effective level is obtained.

For purposes of this disclosure, "substantially daily" means a sufficiently regular basis such that the spinosyn concentration in the mammal's blood rises to and remains at a therapeutically effective level. For example, the disclosed feed composition can preferably be fed to a mammal every day indefinitely. However, as a practical matter, there are many reasons days may be missed or skipped periodically. For example, the mammal may be ill or the owner may run out of the feed composition. The disclosed method is robust enough that the mammal will still be protected from ticks to some extent even with occasional interruptions in doses of spinosyn. In carrying out the method of this disclosure, the term "substantially daily" includes at least 10 days per month, more preferably at least 15 days per month, still more preferably at least 20 days per month. All of these feeding frequencies, whether they be, e.g., three times per week, every other day or daily, fit under the umbrella of "substantially daily" as used in this disclosure, provided that they promote the spinosyn reaching and maintaining a therapeutically effective level of the spinosyn in the mammal's blood.

The term "therapeutically effective" means that the dose of a spinosyn in the feed or concentration of a spinosyn in the blood is sufficient to control the tick infestation better than if no drug were present. The spinosyn may be present in, e.g., the feed, or the mammal's blood on its own or with one or more additional active substances. Preferably it controls the tick infestation at around at least 50% better than if no drug were present, and more preferably it controls the tick infestation at about at least 90% better than if no drug were present.

In carrying out the methods of this disclosure, an effective or therapeutically effective amount of a spinosyn is administered orally to the mammal. The term "effective amount"

or "therapeutically effective amount" refers to the amount needed to control the tick infestation. As those in the art will understand, this amount will vary depending upon a number of factors. These factors include, for example, the type of mammal being treated, its body weight and general physical condition.

While this disclosure describes concentrations of spinosyn in terms of feeds such as kibble, it also contemplates administration using other dosage forms, such as treats or chews. It is also contemplated that the spinosyn may be administered by itself or in a tablet, liquid, gel or other suitable form for oral administration. One of skill in the art will appreciate that the concentration of spinosyn will vary according to the particular dosage form. For example, where the dosage form is a treat or chew, the concentration of spinosyn in the treat or chew will be greater than, e.g., the concentration of spinosyn in kibble. For example, if the daily dose of spinosyn based on the weight of the canine is 10 mg, then a typical 5 g treat or chew would contain about 0.2 percent spinosyn (by weight). Since the amount of kibble consumed in a day is more than 5 g, the percent spinosyn in kibble will be smaller.

In general, an effective amount refers to a dose of from about 0.625 to about 10 mg of the spinosyn/kg of body weight of the mammal. More preferably, an effective amount refers to a dose of from about 1 to about 4.5 mg of the spinosyn/kg of body weight of the mammal. More commonly, the effective amount is from about 1 to about 3.75 mg/kg of body weight of the mammal.

Animal feeds will typically contain from about 0.005 to about 2 percent of spinosyn (by weight) in the feed, preferably between about 0.01 to about 0.5 percent of spinosyn (by weight) in the feed, most preferably between about 0.03 to about 0.2 percent of spinosyn (by weight) in the feed.

In one aspect, this disclosure relates to a method of controlling a tick infestation in a mammal by administering a systemically active oral composition including spinosyn, or a physiologically acceptable derivative or salt thereof, and animal feed at least once per week, more preferably three times per week, most preferably substantially daily.

In another aspect, this disclosure relates to a systemically active oral composition that includes a spinosyn and animal feed.

This disclosure also relates to the use of a spinosyn for the manufacture of an animal feed for controlling a tick infestation on a mammal.

This disclosure also relates to a method of controlling a tick infestation on a mammal for a prolonged time, comprising orally administering daily or substantially daily doses of an effective amount of a spinosyn to the mammal in, e.g., a feed. A daily feed is a feed which is intended to be administered daily, however which may be administered less frequently than daily, as described herein. This method is especially useful for controlling ticks on a mammal for a prolonged time comprising orally administering substantially daily doses of an effective amount of a spinosyn to the mammal.

An aspect of this disclosure is the oral administration of an amount of spinosyn that is, in and of itself, ineffective or sub-optimal for controlling a tick infestation in a mammal in a single dose, e.g., once every month, but over time with repeated administrations, as described herein, results in efficacious control of tick infestations. Ineffective or sub-optimal means that a single dosing, as well as several dosings, results in less than a 50% reduction in the tick infestation, including no, or substantially no, reduction, as compared to no drug administration at all. This reflects the chronic, rather than acute, administration aspect disclosed herein.

Embodiment 1: A method of controlling a tick infestation in a mammal in need thereof, comprising orally administering to said mammal an effective amount of a spinosyn for an effective time at a frequency of at least 4 times per month.

Embodiment 2: The method of embodiment 1, wherein said mammal is selected from the group consisting of a wild animal, a farm animal, a companion animal and a canine.

Embodiment 3: The method of embodiments 1 or 2, wherein said spinosyn is spinosad.

Embodiment 4: The method of any of embodiments 1-3, wherein said is provided in a feed selected from the group consisting of dry food and a wet food.

Embodiment 5: The method of any of embodiments 1-3, wherein said spinosyn is present in an amount of between about 0.005% to 2% of a feed.

Embodiment 6: The method of any of embodiments 1-5, wherein said spinosyn is administered to said mammal in an amount of between about 0.625 mg/kg and 10 mg/kg of weight of said mammal.

Embodiment 7: The method of any of embodiments 1-6, wherein said frequency is selected from the group consisting of at least 3 times per week, substantially daily and daily.

Embodiment 8: The method of any of embodiments 1-7, wherein said effective time is selected from the group consisting of at least one week and at least two weeks.

Embodiment 9: The method of any of embodiments 1-8, wherein said administration provides a therapeutically effective level of spinosyn in said mammal's blood within a time period selected from the group consisting of one week of the first administration of said spinosyn and two days of the first administration of said spinosyn.

Embodiment 10: The method of any of embodiments 1-9, wherein said administration provides a therapeutically effective level of spinosyn in said mammal's blood for a time period selected from the group consisting of at least 30 days, at least 60 days, at least 90 days, at least 180 days and at least 365 days.

Embodiment 11: The method of any of embodiments 1-10, wherein said administration provides a concentration of spinosyn of more than about 300 ng/mL and less than about 6000 ng/mL in said mammal's blood for a period of time selected from the group consisting of at least 30 days and at least 365 days.

Embodiment 12: The method of any of embodiments 1-11, wherein said spinosyn is administered for a number of days selected from the group consisting of at least 15 out of 30 days and at least 20 out of 30 days.

Embodiment 13: The method of any of embodiments 1-12, wherein said spinosyn is provided as a component of a feed that comprises one or more other active substances.

Embodiment 14: The method of any of embodiments 1-13, further comprising discontinuing the administration of spinosyn for a period of time selected from the group consisting of at least 3 days and at least 7 days, wherein the mammal's blood concentration of spinosyn is maintained at a therapeutically effective level during the period of time.

Embodiment 15: The method of embodiment 14, further comprising resuming the administration spinosyn after the discontinuing of the administration of spinosyn and thereby continuing to maintain the mammal's blood concentration of spinosyn at the therapeutically effective level.

Embodiment 16: The method of embodiment 1, wherein the spinosyn is a component of a chew.

Embodiment 17: The method of embodiment 16, wherein the oral administration includes a feeding frequency selected from the group consisting of: at least 3 times per week, substantially daily and daily.

Embodiment 18: A spinosyn for use in controlling ticks on a mammal in need thereof, said spinosyn being administered in an effective amount to said mammal for an effective time at a frequency of at least four times per month.

Embodiment 19: The spinosyn of embodiment 18, wherein said mammal is selected from the group consisting of a wild animal, a farm animal, a companion animal and a canine.

Embodiment 20: The spinosyn of any of embodiments 18-19, wherein said spinosyn is spinosad.

Embodiment 21: The spinosyn of any of embodiments 18-20, wherein said wherein said spinosyn is provided in a feed selected from the group consisting of dry food and wet food.

Embodiment 22: The spinosyn of any of embodiments 18-21, wherein said spinosyn is present in an amount of between about 0.005% to 2% of feed.

Embodiment 23: The spinosyn of any of embodiments 18-22, wherein said spinosyn is administered to said mammal in an amount of between about 0.625 mg/kg and 10 mg/kg of weight of said mammal.

Embodiment 24: The spinosyn of any of embodiments 18-23, wherein said administering includes a feeding frequency selected from the group consisting of at least 3 times per week, substantially daily and daily.

Embodiment 25: The spinosyn of any of embodiments 18-24, wherein said effective time is selected from the group consisting of at least one week and at least two weeks.

Embodiment 26: The spinosyn of any of embodiments 18-25, wherein said administration provides a therapeutically effective level of spinosyn in said mammal's blood within a period of time selected from the group consisting of one week of the first administration of said spinosyn and two days of the first administration of said spinosyn.

Embodiment 27: The spinosyn of any of embodiments 18-26, wherein said administration provides a therapeutically effective level of spinosyn in said mammal's blood for a period of time selected from the group consisting of at least 30 days, at least 60 days, at least 90 days, at least 180 days and at least 365 days.

Embodiment 28: The spinosyn of any of embodiments 18-27, wherein said administration provides a concentration of spinosyn of more than about 300 ng/mL and less than about 6000 ng/mL in said mammal's blood for a period of time selected from the group consisting of at least 30 days and at least 365 days.

Embodiment 29: The spinosyn of any of embodiments 18-28, wherein said feed is administered for a number of days out of 30 selected from the group consisting of at least 15 days and at least 20 days.

Embodiment 30: The spinosyn of any of embodiments 18-29, wherein the spinosyn is a component of a feed that comprises one or more additional active substances.

Embodiment 31: The spinosyn of any of embodiments 18-30, further comprising discontinuing the administration of spinosyn for a period of time selected from the group consisting of at least 3 days and at least 7 days, wherein the mammal's blood concentration of spinosyn is maintained at a therapeutically effective level.

Embodiment 32: The spinosyn of embodiment 31, further comprising resuming the administration of spinosyn after the discontinuing of the administration of spinosyn and thereby maintaining the mammal's blood concentration of spinosyn at the therapeutically effective level.

Embodiment 33: The spinosyn of embodiments 18-32, wherein the spinosyn is a component of a chew.

Embodiment 34: The spinosyn of embodiment 33, wherein the administration includes a feeding frequency selected from the group consisting of: at least 3 times per week, substantially daily and daily.

Embodiment 35: A feed or chew for controlling ticks in a mammal, comprising an effective amount of a spinosyn to control a tick infestation when administered for an effective time at a frequency of at least four times per month.

Embodiment 36: The feed or chew of embodiment 35, wherein said mammal is selected from the group consisting of a wild animal, a farm animal, a companion animal and a canine.

Embodiment 37: The feed or chew of any of embodiments 35-36, wherein said spinosyn is spinosad.

Embodiment 38: The feed or chew of any of embodiments 35-37, wherein said feed or chew is a feed selected from the group consisting of a dry food and a wet food.

Embodiment 39: The feed or chew of any of embodiments 35-38, wherein said spinosyn is present in an amount of between about 0.005% to 2% of a feed.

Embodiment 40: The feed or chew of any of embodiments 35-39, wherein said spinosyn is administered to said mammal in an amount of between about 0.625 mg/kg and 10 mg/kg of weight of said mammal.

Embodiment 41: The feed or chew of any of embodiments 35-40, wherein said administration includes a feeding frequency selected from the group consisting of at least 3 times per week, substantially daily and daily.

Embodiment 42: The feed or chew of any of embodiments 35-41, wherein said effective time comprises administering the feed or chew for a period of time selected from the group consisting of at least one week and at least two weeks.

Embodiment 43: The feed or chew of any of embodiments 35-42, wherein said administration provides a therapeutically effective level of spinosyn in said mammal's blood within a time period selected from the group consisting of one week of the first administration of said feed or chew and two days of the first administration of said feed or chew.

Embodiment 44: The feed or chew of any of embodiments 35-43, wherein said administration provides a therapeutically effective level of spinosyn in said mammal's blood for a time period selected from the group consisting of at least 30 days, at least 60 days, at least 90 days, at least 180 days and at least 365 days.

Embodiment 45: The feed or chew of any of embodiments 35-44, wherein said administration provides a concentration of spinosyn of more than about 300 ng/mL and less than about 6000 ng/mL in said mammal's blood for a period of time selected from the group consisting of at least 30 days and at least 365 days.

Embodiment 46: The feed or chew of any of embodiments 35-45, wherein said feed or chew is administered for a number of days out of 30 selected from the group consisting of at least 15 days and at least 20 days.

Embodiment 47: The feed or chew of any of embodiments 35-46, wherein said feed or chew comprises one or more other active substances.

Embodiment 48: The feed or chew of any of embodiments 35-47, further comprising discontinuing the administration of the feed or chew for a period of time selected from the group consisting of at least 3 days and at least 7 days, wherein the mammal's blood concentration of spinosyn is maintained at a therapeutically effective level.

Embodiment 49: The feed or chew of embodiment 48, further comprising resuming the administration of feed or chew after the discontinuing of the administration of feed or chew and thereby maintaining the mammal's blood concentration of spinosyn at the therapeutically effective level.

In an aspect of any of the embodiments, administration provides a concentration of spinosyn of more than about 300 ng/mL and less than about 6000 ng/mL in said mammal's blood for at least 30 days. More preferably, administration provides a concentration of spinosyn of more than about 300 ng/mL and less than about 2500 ng/mL in said mammal's blood for at least 30 days. Still more preferably, administration provides a concentration of spinosyn of more than about 300 ng/mL and less than about 2000 ng/mL in said mammal's blood for at least 30 days. Still more preferably, administration provides a concentration of spinosyn of more than about 400 ng/mL and less than about 1500 ng/mL in said mammal's blood for at least 30 days.

In an aspect of any of the embodiments, administration provides a concentration of spinosyn of more than about 300 ng/mL and less than about 6000 ng/mL in said mammal's blood for at least 365 days. More preferably, administration provides a concentration of spinosyn of more than about 300 ng/mL and less than about 2500 ng/mL in said mammal's blood for at least 365 days. Still more preferably, administration provides a concentration of spinosyn of more than about 300 ng/mL and less than about 2000 ng/mL in said mammal's blood for at least 365 days. Still more preferably, administration provides a concentration of spinosyn of more than about 400 ng/mL and less than about 1500 ng/mL in said mammal's blood for at least 365 days.

EXAMPLES

The following examples illustrate the methods of this disclosure:

Example 1

Efficacy of Spinosyn Administered per os, i.e. by Mouth, to Dogs for the Treatment and Control of *Rhipicephalus sanguineus*.

Methods: A pool of 40 dogs are to be screened before inclusion in this example by preliminarily infesting them with ~100 unfed adult *Ctenocephalides felis* in order to produce a pool of dogs that can suitably sustain a reliable infestation rate of approximately 50% of live fleas over a 48-hour period. The dogs with the highest live flea counts are to be randomly allocated to 2 treatment groups (6 dogs per group) based on their pre-treatment flea counts from experimental infestations. The first treatment group is to be the control group and the second treatment group to be the test group.

The dogs are to be housed individually during the study period and are to be fed a commercial dry dog food ration with ad libitum access to water.

Each dog in the test group is to receive by mouth a liquid formulation of spinosyn preferably spinosad. The dosage of 2.5 mg/kg of the dog's weight is to be administered to the dogs on each of days 0-29 and the dosage of 5 mg/kg of the dog's weight is to be administered on days 30-50.

Dogs in the control group are not to receive spinosyn or any other tick control treatment. Each dog in the test group is to be offered its daily ration (dry food) and the individual doses of liquid formulation are to be administered after the individual dog has eaten at least 25% of its total daily ration. After receiving the dose of spinosyn the dogs are to be allowed to continue eating. This mimics incorporating the spinosyn in feed. Each dog in the test group and the control group is to be experimentally infested with 50 unfed adult ticks (ca. 50% male/50% female) on test days 12, 19, 28, 35, 42, 49 and 56. Comb counts for attached live and moribund adult ticks are to be conducted on days 14, 21, 30, 37, 44, 51 and 58. Note that the dosage is to be increased at day 30 and the final dose is to be given on day 50.

Results: Referring now to FIG. 1. Percent reduction in attached live and moribund adult tick counts for the test group treated with spinosad as compared to the control group is shown in the graph. Percent Efficacy is determined according to the formula [AM ticks CONTROL−AM ticks TREATED]/AM ticks Control. This is plotted versus time in days after initial treatment. As can be seen in FIG. 1, the daily dose is increased from 2.5 mg/kg/day to 5.0 mg/kg/day at about hour 700 (around day 30). The corresponding increase in efficacy is clear from the efficacy in days 37-50. The efficacy at day 58 is after the about 8 day wash-out period following the last dose on day 50.

Using the same study method as described above, blood is to be drawn at 72, 120, 168, 336, 504, 720 and 888 hours after the initial dose of spinosyn is administered. The average concentration of spinosyn in the blood for different dosage levels can then be determined.

Figure 2:
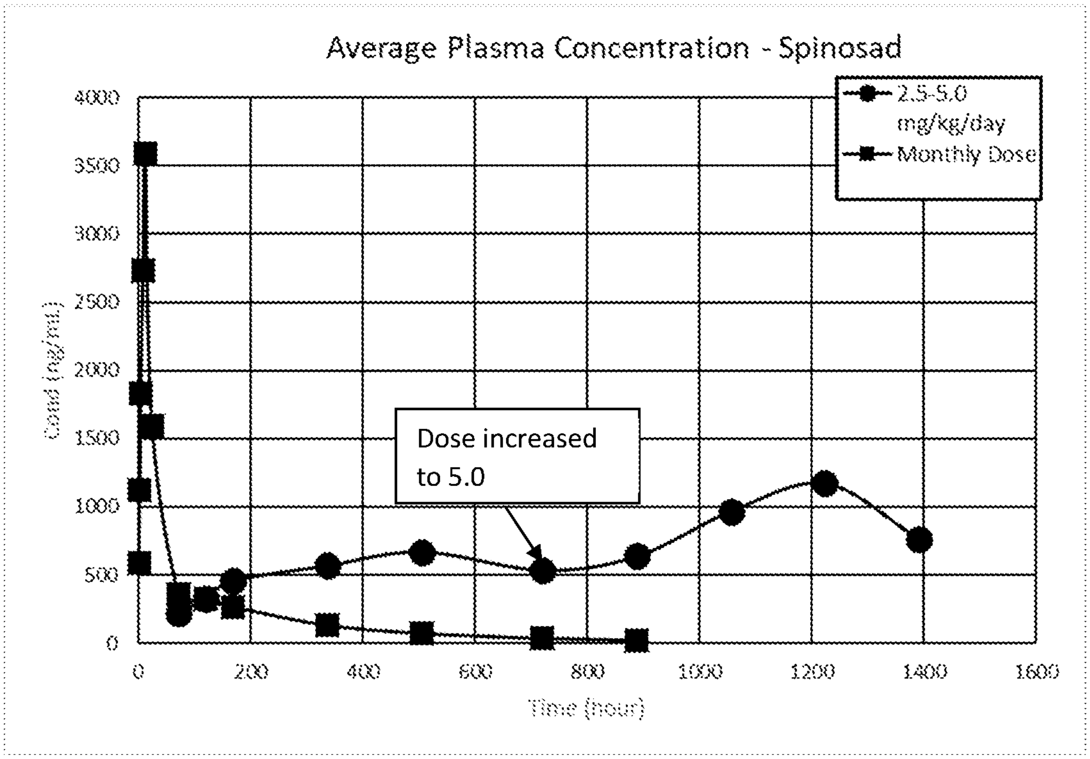
FIG. 2. A graph of the Average Plasma Levels of Spinosad. In units of ng of spinosad per ml of plasma measured over time (in units of hours after dosing). Values determined for animals treated with either 2.5-5.0 mg of spinosad/kg of animal body mass/day (circles) or a once monthly dose (squares). For animals given a daily dose of spinosad, the dose of spinosad was increased from 2.5 mg/kg/day to 5.0 mg/kg/day of spinosad at about 700 hours.

Referring now to TABLE 1 and FIG. 2. Sample results are shown for the average plasma concentration of spinosad in a canine's blood (ng/mL) versus time in hours for different dosage levels of spinosad. By way of comparison, the average plasma concentration of spinosyn for a single-dose administration to be given monthly (squares) is shown with the average plasma concentration of spinosyn for a substantially daily dose of 2.5 mg/kg/day or 5.0 mg/kg/day (circles). The daily dose is increased from 2.5 mg/kg/day to 5.0 mg/kg/day at about hour 700 (around day 30).

TABLE 1

| | Average Plasma Concentration (ng/mL) - Spinosad | |
|---|---|---|
| Hours | 2.5-5.0 mg/kg/day spinosad | Monthly Dose |
| 1 | No Data | 585.43 |
| 2 | No Data | 1119.50 |
| 4 | No Data | 1830.25 |
| 8 | No Data | 2730.50 |
| 12 | No Data | 3592.50 |
| 24 | No Data | 1594.50 |
| 72 | 221.50 | 359.48 |
| 120 | 327.07 | 320.25 |
| 168 | 455.78 | 265.10 |
| 336 | 566.25 | 128.95 |
| 504 | 668.77 | 69.78 |
| 720 | 533.12 | 32.23 |
| 888 | 635.72 | 20.44 |
| 1056 | 967.33 | No Data |
| 1224 | 1172.60 | No Data |
| 1392 | 761.45 | No Data |

While this invention has been described as having an exemplary design, the present invention may be further modified within the spirit and scope of this disclosure. This application is therefore intended to cover any variations, uses, or adaptations of the invention using its general principles.

What is claimed is:

1. A method of controlling a tick infestation in a mammal in need thereof, comprising orally administering to said mammal an effective amount of a spinosyn for a period of time selected from the group consisting of at least one week and at least two weeks at a frequency selected from the group consisting of at least 3 times per week, substantially daily and daily.

2. The method of claim 1, wherein said mammal is selected from the group consisting of: a wild animal; a farm animal; a companion animal; and a canine.

3. The method claim 1, wherein said spinosyn is spinosad.

4. The method of claim 1, wherein said spinosyn is provided in a feed selected from the group consisting of a dry food and a wet food.

5. The method of claim 1, wherein said spinosyn is present in an amount of between about 0.005% to 2% of a feed.

6. The method of claim 1, wherein said spinosyn is administered to said mammal in an amount of between about 0.625 mg/kg and 10 mg/kg of weight of said mammal.

7. The method of claim 1, wherein said administration provides a therapeutically effective level of spinosyn in said mammal's blood within a time period selected from the group consisting of one week of the first administration of said spinosyn and two days of the first administration of said spinosyn.

8. The method of claim 1, wherein said administration provides a therapeutically effective level of spinosyn in said mammal's blood for a time period selected from the group consisting of at least 30 days, at least 60 days, at least 90 days, at least 180 days and at least 365 days.

9. The method of claim 1, wherein said administration provides a concentration of spinosyn in the mammal's blood selected from the group consisting of: more than about 300 ng/mL and less than about 6000 ng/mL in said mammal's blood for at least 30 days; more than about 300 ng/mL and less than about 2500 ng/mL; more than about 300 ng/mL and less than about 2000 ng/mL; and more than about 400 ng/mL and less than about 1500 ng/mL in said mammal's blood for at least 30 days.

10. A method of controlling a tick infestation in a mammal in need thereof, comprising orally administering to said mammal an effective amount of a spinosyn for an effective time at a frequency selected from the group consisting of at least 3 times per week, substantially daily and daily, wherein said administration provides a concentration of spinosyn of more than about 300 ng/mL and less than about 6000 ng/mL in said mammal's blood for a period of time selected from the group consisting of at least 30 days and at least 365 days.

11. The method of claim 1, wherein said spinosyn is administered for a number of days selected from the group consisting of at least 15 out of 30 days and at least 20 out of 30 days.

12. The method of claim 1, wherein said spinosyn is provided as a component of a feed that comprises one or more other active substances.

13. The method of claim 1, further comprising discontinuing the administration of spinosyn for a period of time selected from the group consisting of at least 3 days and at least 7 days, wherein the mammal's blood concentration of spinosyn is maintained at a therapeutically effective level during the period of time.

14. The method of claim 13, further comprising resuming the administration of spinosyn after the discontinuing of the administration of spinosyn and thereby continuing to maintain the mammal's blood concentration of spinosyn at the therapeutically effective level.

15. The method of claim 1, wherein the oral administration includes a feeding frequency selected from the group consisting of at least 3 times per week, substantially daily and daily.

16. A feed or a chew for a mammal, comprising a feed selected from the group consisting of:

a chew, a dry feed and a wet feed; and an effective amount of at least one spinosyn, wherein said feed or chew is formulated for administration to the mammal substantially daily.

17. The feed or a chew of claim 16, wherein said spinosyn is present in an amount of between about 0.005 wt. % to 2 wt. % of the feed or the chew.

18. The feed or the chew of claim 16, wherein said spinosyn in the feed or the chew is administered to said mammal in an amount of between about 0.625 mg/kg and 10 mg/kg of weight of said mammal.

19. The feed or the chew of claim 16, wherein said spinosyn is spinosad.

* * * * *